(12) United States Patent  (10) Patent No.: US 12,223,428 B2
Elluswamy et al.  (45) Date of Patent: *Feb. 11, 2025

(54) GENERATING GROUND TRUTH FOR MACHINE LEARNING FROM TIME SERIES ELEMENTS

(71) Applicant: Tesla, Inc., Austin, TX (US)

(72) Inventors: Ashok Kumar Elluswamy, Sunnyvale, CA (US); Matthew Bauch, San Francisco, CA (US); Christopher Payne, San Francisco, CA (US); Andrej Karpathy, San Francisco, CA (US); Joseph Polin, San Francisco, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,954

(22) Filed: Sep. 1, 2023

(65) Prior Publication Data

US 2024/0070460 A1 Feb. 29, 2024

Related U.S. Application Data

(63) Continuation of application No. 17/301,965, filed on Apr. 20, 2021, now Pat. No. 11,748,620, which is a
(Continued)

(51) Int. Cl.
G06N 3/08 (2023.01)
G05D 1/00 (2006.01)
(Continued)

(52) U.S. Cl.
CPC ............. *G06N 3/08* (2013.01); *G05D 1/0221* (2013.01); *G06F 18/28* (2023.01); *G06V 20/588* (2022.01); *G16Y 20/10* (2020.01); *G06N 3/04* (2013.01)

(58) Field of Classification Search
None
See application file for complete search history.

(56) References Cited

U.S. PATENT DOCUMENTS 6,882,755 B2 4/2005 Silverstein et al.
7,209,031 B2 4/2007 Nakai et al.
(Continued)

FOREIGN PATENT DOCUMENTS

AU 2019261735 A1 5/2016
AU 2019201716 A1 10/2020
(Continued)

OTHER PUBLICATIONS

Foreign Office Action on JP Patent Application No. 2021-544312 dated Aug. 22, 2023 (7 pages incl. English translation).
(Continued)

*Primary Examiner* — Leon Flores
(74) *Attorney, Agent, or Firm* — Foley & Lardner LLP

(57) ABSTRACT

Sensor data, including a group of time series elements, is received. A training data set is determined, including by determining for at least a selected time series element in the group of time series elements a corresponding ground truth. The corresponding ground truth is based on a plurality of time series elements in the group of time series elements. A processor is used to train a machine learning model using the training dataset.

20 Claims, 6 Drawing Sheets

Related U.S. Application Data continuation of application No. 16/265,729, filed on Feb. 1, 2019, now Pat. No. 10,997,461.

(51) Int. Cl.
*G06F 18/28* (2023.01)
*G06V 20/56* (2022.01)
*G16Y 20/10* (2020.01)
*G06N 3/04* (2023.01)

(56) References Cited

U.S. PATENT DOCUMENTS

| | | | |
|---|---|---|---|
| 7,747,070 B2 | 6/2010 | Puri | |
| 7,904,867 B2 | 3/2011 | Burch et al. | |
| 7,974,492 B2 | 7/2011 | Nishijima | |
| 8,165,380 B2 | 4/2012 | Choi et al. | |
| 8,369,633 B2 | 2/2013 | Lu et al. | |
| 8,406,515 B2 | 3/2013 | Cheatle | |
| 8,509,478 B2 | 8/2013 | Haas et al. | |
| 8,588,470 B2 | 11/2013 | Rodriguez Serrano et al. | |
| 8,744,174 B2 | 6/2014 | Hamada et al. | |
| 8,773,498 B2 | 7/2014 | Lindbergh | |
| 8,912,476 B2 | 12/2014 | Fogg | |
| 8,913,830 B2 | 12/2014 | Sun et al. | |
| 8,928,753 B2 | 1/2015 | Han et al. | |
| 8,972,095 B2 | 3/2015 | Furuno et al. | |
| 8,976,269 B2 | 3/2015 | Duong | |
| 9,008,422 B2 | 4/2015 | Eid et al. | |
| 9,081,385 B1 | 7/2015 | Ferguson et al. | |
| 9,275,289 B2 | 3/2016 | Li et al. | |
| 9,586,455 B2 | 3/2017 | Sugai et al. | |
| 9,672,437 B2 | 6/2017 | Mccarthy | |
| 9,710,696 B2 | 7/2017 | Wang et al. | |
| 9,738,223 B2 | 8/2017 | Zhang et al. | |
| 9,754,154 B2 | 9/2017 | Craig et al. | |
| 9,767,369 B2 | 9/2017 | Furman et al. | |
| 9,965,865 B1 | 5/2018 | Agrawal et al. | |
| 10,133,273 B2 | 11/2018 | Linke | |
| 10,140,252 B2 | 11/2018 | Fowers et al. | |
| 10,140,544 B1 | 11/2018 | Zhao et al. | |
| 10,146,225 B2 | 12/2018 | Ryan | |
| 10,152,655 B2 | 12/2018 | Krishnamurthy | |
| 10,167,800 B1 | 1/2019 | Chung et al. | |
| 10,169,680 B1 | 1/2019 | Sachdeva et al. | |
| 10,192,016 B2 | 1/2019 | Ng et al. | |
| 10,216,189 B1 | 2/2019 | Haynes | |
| 10,228,693 B2 | 3/2019 | Micks et al. | |
| 10,242,293 B2 | 3/2019 | Shim | |
| 10,248,121 B2 | 4/2019 | Vandenberg | |
| 10,262,218 B2 | 4/2019 | Lee et al. | |
| 10,282,623 B1 | 5/2019 | Ziyaee et al. | |
| 10,296,828 B2 | 5/2019 | Viswanathan | |
| 10,303,961 B1 | 5/2019 | Stoffel et al. | |
| 10,310,087 B2 | 6/2019 | Laddha et al. | |
| 10,311,312 B2 | 6/2019 | Yu et al. | |
| 10,318,848 B2 | 6/2019 | Dijkman et al. | |
| 10,325,178 B1 | 6/2019 | Tang et al. | |
| 10,331,974 B2 | 6/2019 | Zia et al. | |
| 10,338,600 B2 | 7/2019 | Yoon et al. | |
| 10,343,607 B2 | 7/2019 | Kumon | |
| 10,345,822 B1 | 7/2019 | Parchami et al. | |
| 10,359,783 B2 | 7/2019 | Williams et al. | |
| 10,366,290 B2 | 7/2019 | Wang | |
| 10,372,130 B1 | 8/2019 | Kaushansky et al. | |
| 10,373,019 B2 | 8/2019 | Nariyambut Murali et al. | |
| 10,373,026 B1 | 8/2019 | Kim | |
| 10,380,741 B2 | 8/2019 | Yedla et al. | |
| 10,394,237 B2 | 8/2019 | Xu et al. | |
| 10,395,144 B2 | 8/2019 | Zeng et al. | |
| 10,402,646 B2 | 9/2019 | Klaus | |
| 10,402,986 B2 | 9/2019 | Ray et al. | |
| 10,414,395 B1 | 9/2019 | Sapp | |
| 10,423,934 B1 | 9/2019 | Zanghi et al. | |
| 10,436,615 B2 | 10/2019 | Agarwal et al. | |
| 10,452,905 B2 | 10/2019 | Segalovitz et al. | |
| 10,460,053 B2 | 10/2019 | Olson et al. | |
| 10,467,459 B2 | 11/2019 | Chen et al. | |
| 10,468,008 B2 | 11/2019 | Beckman et al. | |
| 10,468,062 B1 | 11/2019 | Levinson et al. | |
| 10,470,510 B1 | 11/2019 | Koh et al. | |
| 10,474,160 B2 | 11/2019 | Huang et al. | |
| 10,474,161 B2 | 11/2019 | Huang et al. | |
| 10,474,928 B2 | 11/2019 | N et al. | |
| 10,489,126 B2 | 11/2019 | Kumar et al. | |
| 10,489,972 B2 | 11/2019 | Atsmon | |
| 10,503,971 B1 | 12/2019 | Dang et al. | |
| 10,514,711 B2 | 12/2019 | Bar-Nahum et al. | |
| 10,528,824 B2 | 1/2020 | Zou | |
| 10,529,078 B2 | 1/2020 | Abreu et al. | |
| 10,529,088 B2 | 1/2020 | Fine et al. | |
| 10,534,854 B2 | 1/2020 | Sharma et al. | |
| 10,535,191 B2 | 1/2020 | Sachdeva et al. | |
| 10,542,930 B1 | 1/2020 | Sanchez et al. | |
| 10,546,197 B2 | 1/2020 | Shrestha et al. | |
| 10,546,217 B2 | 1/2020 | Albright et al. | |
| 10,552,682 B2 | 2/2020 | Jonsson et al. | |
| 10,559,386 B1 | 2/2020 | Neumann | |
| 10,565,475 B2 | 2/2020 | Lecue et al. | |
| 10,567,674 B2 | 2/2020 | Kirsch | |
| 10,568,570 B1 | 2/2020 | Sherpa | |
| 10,572,717 B1 | 2/2020 | Zhu | |
| 10,574,905 B2 | 2/2020 | Srikanth et al. | |
| 10,579,058 B2 | 3/2020 | Oh et al. | |
| 10,579,063 B2 | 3/2020 | Haynes et al. | |
| 10,579,897 B2 | 3/2020 | Redmon et al. | |
| 10,586,280 B2 | 3/2020 | Mckenna et al. | |
| 10,591,914 B2 | 3/2020 | Palanisamy et al. | |
| 10,592,785 B2 | 3/2020 | Zhu et al. | |
| 10,599,701 B2 | 3/2020 | Liu | |
| 10,599,930 B2 | 3/2020 | Lee et al. | |
| 10,599,958 B2 | 3/2020 | He et al. | |
| 10,606,990 B2 | 3/2020 | Tuli et al. | |
| 10,609,434 B2 | 3/2020 | Singhai | |
| 10,614,344 B2 | 4/2020 | Anthony et al. | |
| 10,621,513 B2 | 4/2020 | Deshpande | |
| 10,627,818 B2 | 4/2020 | Sapp et al. | |
| 10,628,432 B2 | 4/2020 | Guo et al. | |
| 10,628,686 B2 | 4/2020 | Ogale et al. | |
| 10,628,688 B1 | 4/2020 | Kim et al. | |
| 10,629,080 B2 | 4/2020 | Kazemi et al. | |
| 10,636,161 B2 | 4/2020 | Uchigaito | |
| 10,636,169 B2 | 4/2020 | Estrada et al. | |
| 10,642,275 B2 | 5/2020 | Silva et al. | |
| 10,645,344 B2 | 5/2020 | Marman et al. | |
| 10,649,464 B2 | 5/2020 | Gray | |
| 10,650,071 B2 | 5/2020 | Asgekar et al. | |
| 10,652,565 B1 | 5/2020 | Zhang | |
| 10,656,657 B2 | 5/2020 | Djuric et al. | |
| 10,657,391 B2 | 5/2020 | Chen et al. | |
| 10,657,418 B2 | 5/2020 | Marder | |
| 10,657,934 B1 | 5/2020 | Kolen et al. | |
| 10,661,902 B1 | 5/2020 | Tavshikar | |
| 10,664,750 B2 | 5/2020 | Greene | |
| 10,671,082 B2 | 6/2020 | Huang et al. | |
| 10,671,886 B2 | 6/2020 | Price et al. | |
| 10,678,244 B2 | 6/2020 | Iandola et al. | |
| 10,678,839 B2 | 6/2020 | Gordon et al. | |
| 10,678,997 B2 | 6/2020 | Ahuja et al. | |
| 10,679,129 B2 | 6/2020 | Baker | |
| 10,685,159 B2 | 6/2020 | Su et al. | |
| 10,685,188 B1 | 6/2020 | Zhang et al. | |
| 10,692,000 B2 | 6/2020 | Surazhsky et al. | |
| 10,692,242 B1 | 6/2020 | Morrison et al. | |
| 10,693,740 B2 | 6/2020 | Coccia | |
| 10,698,868 B2 | 6/2020 | Guggilla | |
| 10,699,119 B2 | 6/2020 | Lo et al. | |
| 10,699,140 B2 | 6/2020 | Kench et al. | |
| 10,699,477 B2 | 6/2020 | Levinson | |
| 10,713,502 B2 | 7/2020 | Tiziani | |
| 10,719,759 B2 | 7/2020 | Kutliroff | |
| 10,725,475 B2 | 7/2020 | Yang et al. | |
| 10,726,264 B2 | 7/2020 | Sawhney et al. | |
| 10,726,279 B1 | 7/2020 | Kim et al. | |
| 10,726,374 B1 | 7/2020 | Engineer et al. | |

(56) References Cited

U.S. PATENT DOCUMENTS

| | | |
|---|---|---|
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi-Gonzalez et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,494 B2 | 9/2020 | Xiao |
| 10,769,525 B2 | 9/2020 | Redding et al. |
| 10,776,626 B1 | 9/2020 | Lin et al. |
| 10,776,673 B2 | 9/2020 | Kim |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi-Gonzalez et al. |
| 10,817,732 B2 | 10/2020 | Porter et al. |
| 10,819,923 B1 | 10/2020 | Mccauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao |
| 10,838,936 B2 | 11/2020 | Cohen |
| 10,839,230 B2 | 11/2020 | Charette et al. |
| 10,839,578 B2 | 11/2020 | Coppersmith, III |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al Shehri et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado Bataller et al. |
| 10,908,068 B2 | 2/2021 | Amer et al. |
| 10,908,606 B2 | 2/2021 | Stein et al. |
| 10,909,368 B2 | 2/2021 | Guo |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 10,997,461 B2 * | 5/2021 | Elluswamy ............ G06F 18/28 |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Ushijima et al. |
| 2012/0109915 A1 | 5/2012 | Kamekawa |
| 2012/0110491 A1 | 5/2012 | Cheung |
| 2012/0134595 A1 | 5/2012 | Fonseca et al. |
| 2015/0104102 A1 | 4/2015 | Carreira |
| 2015/0321699 A1 | 11/2015 | Rebhan et al. |
| 2016/0132786 A1 | 5/2016 | Balan et al. |
| 2016/0328856 A1 | 11/2016 | Mannino et al. |
| 2017/0011281 A1 | 1/2017 | Dijkman |
| 2017/0158134 A1 | 6/2017 | Shigemura |
| 2017/0197618 A1 | 7/2017 | Ali et al. |
| 2017/0206434 A1 | 7/2017 | Nariyambut Murali et al. |
| 2018/0012411 A1 | 1/2018 | Richey et al. |
| 2018/0018590 A1 | 1/2018 | Szeto et al. |
| 2018/0023960 A1 | 1/2018 | Fridman |
| 2018/0039853 A1 | 2/2018 | Liu et al. |
| 2018/0067489 A1 | 3/2018 | Oder et al. |
| 2018/0068459 A1 | 3/2018 | Zhang |
| 2018/0068540 A1 | 3/2018 | Romanenko et al. |
| 2018/0074506 A1 | 3/2018 | Branson |
| 2018/0120843 A1 | 5/2018 | Berntorp et al. |
| 2018/0121762 A1 | 5/2018 | Han |
| 2018/0136644 A1 | 5/2018 | Levinson et al. |
| 2018/0150081 A1 | 5/2018 | Gross et al. |
| 2018/0211403 A1 | 7/2018 | Hotson et al. |
| 2018/0308012 A1 | 10/2018 | Mummadi |
| 2018/0314878 A1 | 11/2018 | Lee et al. |
| 2018/0341261 A1 | 11/2018 | Kislovskiy et al. |
| 2018/0349785 A1 | 12/2018 | Zheng et al. |
| 2018/0357511 A1 | 12/2018 | Misra |
| 2018/0373263 A1 | 12/2018 | Gray |
| 2018/0373943 A1 | 12/2018 | Tanigawa et al. |
| 2018/0374105 A1 | 12/2018 | Azout et al. |
| 2019/0023277 A1 | 1/2019 | Roger |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi-Gonzalez et al. |
| 2019/0080602 A1 | 3/2019 | Rice et al. |
| 2019/0095780 A1 | 3/2019 | Zhong et al. |
| 2019/0095946 A1 | 3/2019 | Azout et al. |

(56) References Cited

U.S. PATENT DOCUMENTS

| | | |
|---|---|---|
| 2019/0101914 A1 | 4/2019 | Coleman et al. |
| 2019/0108417 A1 | 4/2019 | Talagala et al. |
| 2019/0122111 A1 | 4/2019 | Min |
| 2019/0130255 A1 | 5/2019 | Yim et al. |
| 2019/0145765 A1 | 5/2019 | Luo et al. |
| 2019/0146497 A1 | 5/2019 | Urtasun |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari Tafti et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon |
| 2019/0286652 A1 | 9/2019 | Habbecke et al. |
| 2019/0286972 A1 | 9/2019 | El Husseini et al. |
| 2019/0287028 A1 | 9/2019 | St. Amant et al. |
| 2019/0289281 A1 | 9/2019 | Badrinarayanan et al. |
| 2019/0294177 A1 | 9/2019 | Kwon |
| 2019/0294975 A1 | 9/2019 | Sachs |
| 2019/0310651 A1* | 10/2019 | Vallespi-Gonzalez ............ G01C 21/1652 |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos, Jr. et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao et al. |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu |
| 2020/0051550 A1 | 2/2020 | Baker |
| 2020/0060757 A1 | 2/2020 | Ben-Haim et al. |
| 2020/0065711 A1 | 2/2020 | Clément |
| 2020/0065879 A1 | 2/2020 | Hu |
| 2020/0069973 A1 | 3/2020 | Lou et al. |
| 2020/0073385 A1 | 3/2020 | Jobanputra |
| 2020/0074230 A1 | 3/2020 | Englard |
| 2020/0086880 A1 | 3/2020 | Poeppel et al. |
| 2020/0089243 A1 | 3/2020 | Poeppel et al. |
| 2020/0089969 A1 | 3/2020 | Lakshmi Narayanan |
| 2020/0090056 A1 | 3/2020 | Singhal |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella |
| 2020/0117889 A1 | 4/2020 | Laput |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess |
| 2020/0126129 A1 | 4/2020 | Lkhamsuren |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip Leon et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo Abolfathi et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |

(56) References Cited

U.S. PATENT DOCUMENTS

| | | |
|---|---|---|
| 2020/0192389 A1 | 6/2020 | Remine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | Du Toit et al. |
| 2020/0218722 A1 | 7/2020 | Mai et al. |
| 2020/0218979 A1 | 7/2020 | Kwon et al. |
| 2020/0223434 A1 | 7/2020 | Campos Macias et al. |
| 2020/0225758 A1 | 7/2020 | Tang et al. |
| 2020/0226377 A1 | 7/2020 | Campos Macias et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier |
| 2020/0320132 A1 | 10/2020 | Neumann |
| 2020/0324073 A1 | 10/2020 | Rajan Kesavelu Shekar et al. |
| 2020/0327192 A1 | 10/2020 | Hackman et al. |
| 2020/0327443 A1 | 10/2020 | Van Vredendaal et al. |
| 2020/0327449 A1 | 10/2020 | Tiwari et al. |
| 2020/0327662 A1 | 10/2020 | Liu et al. |
| 2020/0327667 A1 | 10/2020 | Arbel |
| 2020/0331476 A1 | 10/2020 | Chen et al. |
| 2020/0334416 A1 | 10/2020 | Vianu et al. |
| 2020/0334495 A1 | 10/2020 | Al-Rfou et al. |
| 2020/0334501 A1 | 10/2020 | Lin et al. |
| 2020/0334551 A1 | 10/2020 | Javidi |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | Mcgavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2022/0107651 A1 | 4/2022 | Elluswamy et al. |

FOREIGN PATENT DOCUMENTS

| | | |
|---|---|---|
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |

(56) References Cited

FOREIGN PATENT DOCUMENTS

| | | |
|---|---|---|
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599537 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111307162 B | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A1 | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 20 2017 102 235 U1 | 5/2017 |
| DE | 20 2017 102 238 U1 | 5/2017 |
| DE | 10 2017 116 017 A1 | 1/2019 |
| DE | 10 2018 130 821 A1 | 6/2020 |
| DE | 10 2019 008 316 A1 | 8/2020 |
| EP | 1 215 626 B1 | 9/2008 |
| EP | 2 228 666 B1 | 9/2012 |
| EP | 2 420 408 B1 | 5/2013 |
| EP | 2 723 069 A1 | 4/2014 |
| EP | 2 741 253 A1 | 6/2014 |
| EP | 3 115 772 A1 | 1/2017 |
| EP | 2 618 559 B1 | 8/2017 |
| EP | 3 285 485 A1 | 2/2018 |
| EP | 3 309 640 A2 | 4/2018 |
| EP | 2 863 633 B1 | 2/2019 |
| EP | 3 113 080 B1 | 5/2019 |
| EP | 3 525 132 A1 | 8/2019 |
| EP | 3 531 689 A1 | 8/2019 |
| EP | 3 537 340 A1 | 9/2019 |
| EP | 3 543 917 A1 | 9/2019 |
| EP | 3 608 840 A1 | 2/2020 |
| EP | 3 657 387 A1 | 5/2020 |
| EP | 2 396 750 B1 | 6/2020 |
| EP | 3 664 020 A1 | 6/2020 |
| EP | 3 690 712 A1 | 8/2020 |
| EP | 3 690 730 A2 | 8/2020 |
| EP | 3 690 742 A1 | 8/2020 |
| EP | 3 722 992 A1 | 10/2020 |

(56) References Cited

FOREIGN PATENT DOCUMENTS

| | | |
|---|---|---|
| EP | 3 739 486 A1 | 11/2020 |
| EP | 3 501 897 B1 | 12/2020 |
| EP | 3 751 455 A2 | 12/2020 |
| EP | 3 783 527 A1 | 2/2021 |
| GB | 2 402 572 B | 8/2005 |
| GB | 2 548 087 A | 9/2017 |
| GB | 2 577 485 A | 4/2020 |
| GB | 2 517 270 B | 6/2020 |
| JP | 2578262 Y2 | 8/1998 |
| JP | 2005-037348 A | 2/2005 |
| JP | 3941252 B2 | 7/2007 |
| JP | 4282583 B2 | 6/2009 |
| JP | 4300098 B2 | 7/2009 |
| JP | 2015-004922 A | 1/2015 |
| JP | 2016-004446 A | 1/2016 |
| JP | 5863536 B2 | 2/2016 |
| JP | 6044134 B2 | 12/2016 |
| JP | 2017-215940 A | 12/2017 |
| JP | 2019-006164 A | 1/2019 |
| JP | 2019-008519 A | 1/2019 |
| JP | 2019-101535 A | 6/2019 |
| JP | 6525707 B2 | 6/2019 |
| JP | 2019-519851 A | 7/2019 |
| JP | 2019-185528 A | 10/2019 |
| JP | 2020-101927 A | 7/2020 |
| JP | 2020-173744 A | 10/2020 |
| KR | 100326702 B1 | 3/2002 |
| KR | 101082878 B1 | 11/2011 |
| KR | 101738422 B1 | 5/2017 |
| KR | 10-2019-0000843 A | 1/2019 |
| KR | 101969864 B1 | 4/2019 |
| KR | 101996167 B1 | 7/2019 |
| KR | 102022388 B1 | 9/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 102020014266 A | 12/2020 |
| TW | 200630819 A | 9/2006 |
| TW | I294089 B | 3/2008 |
| TW | I306207 B | 2/2009 |
| WO | WO-02/052835 A2 | 7/2002 |
| WO | WO-2016/032398 A2 | 3/2016 |
| WO | WO-2016/048108 A1 | 3/2016 |
| WO | WO-2016/207875 A1 | 12/2016 |
| WO | WO-2017/158622 A2 | 9/2017 |
| WO | WO-2017/194890 A1 | 11/2017 |
| WO | WO-2018/175441 A1 | 9/2018 |
| WO | WO-2019/005547 A1 | 1/2019 |
| WO | WO-2019/067695 A1 | 4/2019 |
| WO | WO-2019/089339 A1 | 5/2019 |
| WO | WO-2019/092456 A1 | 5/2019 |
| WO | WO-2019/099622 A1 | 5/2019 |
| WO | WO-2019/122952 A1 | 6/2019 |
| WO | WO-2019/125191 A1 | 6/2019 |
| WO | WO-2019/126755 A1 | 6/2019 |
| WO | WO-2019/144575 A1 | 8/2019 |
| WO | WO-2019/182782 A1 | 9/2019 |
| WO | WO-2019/191578 A1 | 10/2019 |
| WO | WO-2019/216938 A1 | 11/2019 |
| WO | WO-2019/220436 A2 | 11/2019 |
| WO | WO-2020/006154 A2 | 1/2020 |
| WO | WO-2020/012756 A1 | 1/2020 |
| WO | WO-2020/025696 A1 | 2/2020 |
| WO | WO-2020/034663 A1 | 2/2020 |
| WO | WO-2020/056157 A1 | 3/2020 |
| WO | WO-2020/076356 A1 | 4/2020 |
| WO | WO-2020/097221 A1 | 5/2020 |
| WO | WO-2020/101246 A1 | 5/2020 |
| WO | WO-2020/120050 A1 | 6/2020 |
| WO | WO-2020/121973 A1 | 6/2020 |
| WO | WO-2020/131140 A1 | 6/2020 |
| WO | WO-2020/139181 A1 | 7/2020 |
| WO | WO-2020/139355 A1 | 7/2020 |
| WO | WO-2020/139357 A1 | 7/2020 |
| WO | WO-2020/142193 A1 | 7/2020 |
| WO | WO-2020/146445 A1 | 7/2020 |
| WO | WO-2020/151329 A1 | 7/2020 |
| WO | WO-2020/157761 A1 | 8/2020 |
| WO | WO-2020/163455 A1 | 8/2020 |
| WO | WO-2020/167667 A1 | 8/2020 |
| WO | WO-2020/174262 A1 | 9/2020 |
| WO | WO-2020/177583 A1 | 9/2020 |
| WO | WO-2020/185233 A1 | 9/2020 |
| WO | WO-2020/185234 A1 | 9/2020 |
| WO | WO-2020/195658 A1 | 10/2020 |
| WO | WO-2020/198189 A1 | 10/2020 |
| WO | WO-2020/198779 A1 | 10/2020 |
| WO | WO-2020/205597 A1 | 10/2020 |
| WO | WO-2020/221200 A1 | 11/2020 |
| WO | WO-2020/240284 A2 | 12/2020 |
| WO | WO-2020/260020 A1 | 12/2020 |
| WO | WO-2020/264010 A1 | 12/2020 |

OTHER PUBLICATIONS

First Office Action on EP Application No. 20708802.2 dated Jun. 19, 2024 (10 pages).

Garnett et al., Nov. 27, 2018, 3D-lanenet: end-to-end 3D multiple lane detection, Cornell University, 9 pp.

Google search related to autonomous vehicle train neural network images Princeton.edu "Real-time object detection for autonomous vehicles using . . . " Nvidia Developer "Deep Learning for Automated Driving with MATLAB | NVIDIA".

International Search Report and Written Opinion dated Mar. 7, 2020 in application No. PCT/US2020/015371.

International Search Report and Written Opinion on PCT/US2020/015371 dated Aug. 6, 2020.

IPRP and WO on PCT/US2020/015371 dated Aug. 12, 2021 (7 pages).

Jang, Mar. 14, 2018, When autonomous driving and robotics meet, TechM newspaper article, 11 pp.

Notice Before Acceptance on IL285153 dated Sep. 21, 2023 (4 pages).

Foreign Office Action on JP Patent Application No. 2021-544312 dated Mar. 5, 2024 (4 pages incl. English translation).

Notice of Eligibility of Grant and final Examination Report on SG 11202108322Q dated Aug. 31, 2023 (8 pages).

Written Decision on Registration on KR1020217026370 dtd. Aug. 21, 2023 (6 pages).

Non-Final Rejection Korean Patent Application No. 10-2023-7039946 DTD Nov. 18, 2024 (7 Pages).

\* cited by examiner

GENERATING GROUND TRUTH FOR MACHINE LEARNING FROM TIME SERIES ELEMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Deep learning systems used for applications such as autonomous driving are developed by training a machine learning model. Typically, the performance of the deep learning system is limited at least in part by the quality of the training set used to train the model. In many instances, significant resources are invested in collecting, curating, and annotating the training data. Traditionally, much of the effort to curate a training data set is done manually by reviewing potential training data and properly labeling the features associated with the data. The effort required to create a training set with accurate labels can be significant and is often tedious. Moreover, it is often difficult to collect and accurately label data that a machine learning model needs improvement on. Therefore, there exists a need to improve the process for generating training data with accurate labeled features.

BRIEF DESCRIPTION OF THE DRAWINGS

Various embodiments of the invention are disclosed in the following detailed description and the accompanying drawings.

DETAILED DESCRIPTION

Figure 1:
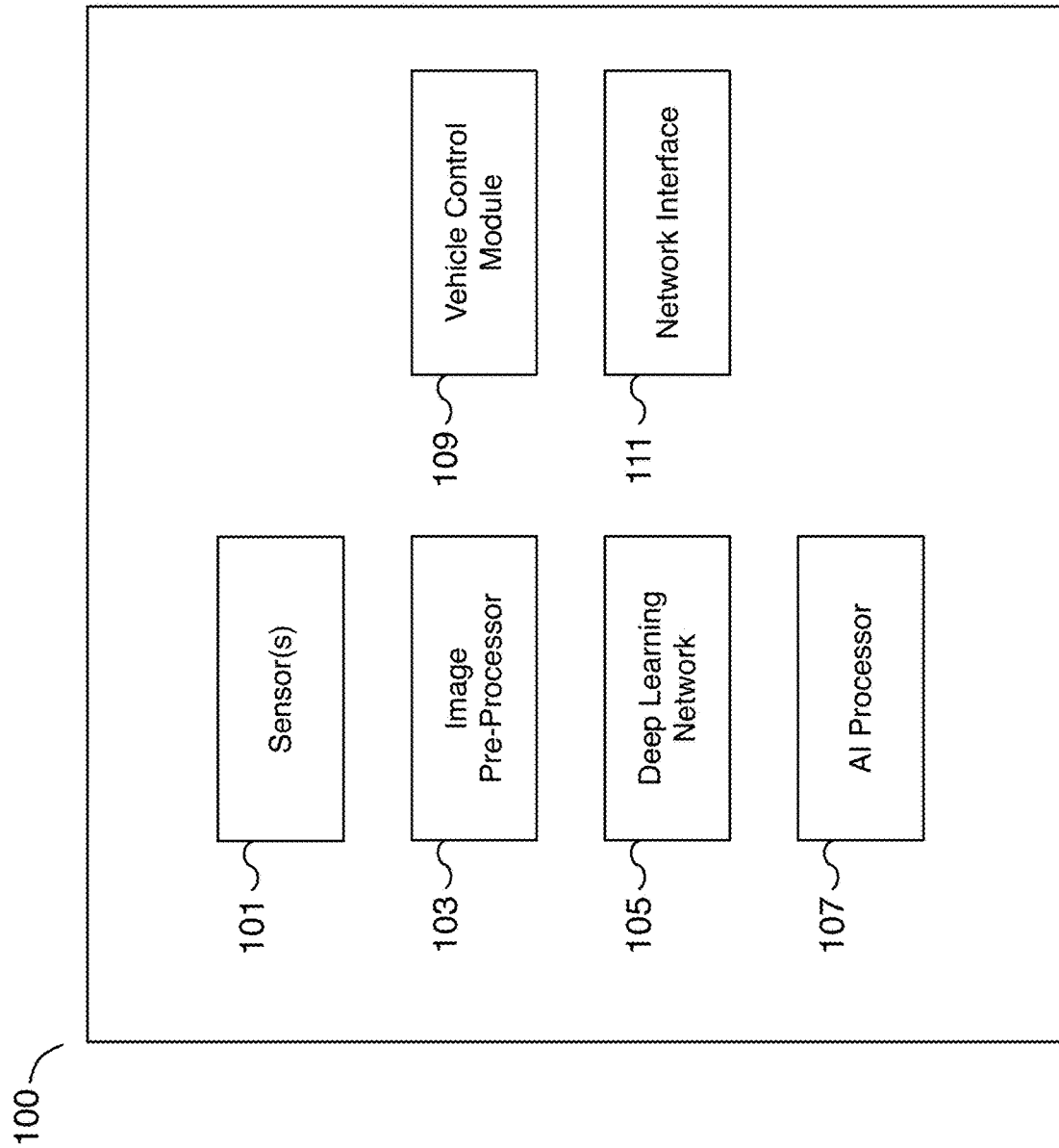
FIG. 1 is a block diagram illustrating an embodiment of a deep learning system for autonomous driving.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A machine learning training technique for generating highly accurate machine learning results is disclosed. Using data captured by sensors on a vehicle to capture the environment of the vehicle and vehicle operating parameters, a training data set is created. For example, sensors affixed to a vehicle capture data such as image data of the road and the surrounding environment a vehicle is driving on. The sensor data may capture vehicle lane lines, vehicle lanes, other vehicle traffic, obstacles, traffic control signs, etc. Odometry and other similar sensors capture vehicle operating parameters such as vehicle speed, steering, orientation, change in direction, change in location, change in elevation, change in speed, etc. The captured data sets are transmitted to a training server for creating a training data set. The training data set is used to train a machine learning model for generating highly accurate machine learning results. In some embodiments, a time series of captured data is used to generate the training data. For example, a ground truth is determined based on a group of time series elements and is associated with a single element from the group. As one example, a series of images for a time period, such as 30 seconds, is used to determine the actual path of a vehicle lane line over the time period the vehicle travels. The vehicle lane line is determined by using the most accurate images of the vehicle lane over the time period. Different portions (or locations) of the lane line may be identified from different image data of the time series. As the vehicle travels in a lane alongside a lane line, more accurate data is captured for different portions of the lane line. In some examples, occluded portions of the lane line are revealed as the vehicle travels, for example, along a hidden curve or over a crest of a hill. The most accurate portions of the lane line from each image of the time series may be used to identify a lane line over the entire group of image data. Image data of the lane line in the distance is typically less detailed than image data of the lane line near the vehicle. By capturing a time series of image data as a vehicle travels along a lane, accurate image data and corresponding odometry data for all portions of the corresponding lane line are collected.

In some embodiments, a three-dimensional representation of a feature, such as a lane line, is created from the group of time series elements that corresponds to the ground truth. This ground truth is then associated with a subset of the time series elements, such as a single image frame of the group of captured image data. For example, the first image of a group of images is associated with the ground truth for a lane line represented in three-dimensional space. Although the ground truth is determined based on the group of images, the selected first frame and the ground truth are used to create a training data. As an example, training data is created for predicting a three-dimensional representation of a vehicle lane using only a single image. In some embodiments, any element or a group of elements of a group of time series elements is associated with the ground truth and used to create training data. For example, the ground truth may be applied to an entire video sequence for creating training data. As another example, an intermediate element or the last element of a group of time series elements is associated with the ground truth and used to create training data.

In various embodiments, the selected image and ground truth may apply to different features such as lane lines, path prediction for vehicles including neighboring vehicles, depth distances of objects, traffic control signs, etc. For example, a series of images of a vehicle in an adjacent lane is used to predict that vehicle's path. Using the time series of images and the actual path taken by the adjacent vehicle, a single image of the group and the actual path taken can be used as training data to predict the path of the vehicle. The information can also be used to predict whether an adjacent vehicle will cut into the path of the autonomous vehicle. For example, the path prediction can predict whether an adjacent vehicle will merge in front of an autonomous vehicle. The autonomous vehicle can be controlled to minimize the likelihood of a collision. For example, the autonomous vehicle can slow down to prevent a collision, adjust the speed and/or steering of the vehicle to prevent a collision, initiate a warning to the adjacent vehicle and/or occupants of the autonomous vehicle, and/or change lanes, etc. In various embodiments, the ability to accurately infer path predictions including vehicle path predictions significantly improves the safety of the autonomous vehicle.

In some embodiments, the trained machine learning model is used to predict a three-dimensional representation of one or more features for autonomous driving including lane lines. For example, instead of identifying a lane line in two-dimensions from image data by segmenting an image of a lane line, a three-dimensional representation is generated using the time series of elements and odometry data corresponding to the time series. The three-dimensional representation includes changes in elevation that greatly improve the accuracy of lane line detection and the detection of corresponding lanes and identified drivable paths. In some embodiments, a lane line is represented using one or more splines or another parameterized form of representation. The use of a piecewise polynomial to represent a lane line greatly reduces the computational resources needed to evaluate a three dimensional object. This reduction in computational resources corresponds to an improvement in processing speed and efficiency without significantly sacrificing the accuracy of the representation. In various embodiments, a lane line, including in particular the curves of the lane line, can be represented using a piecewise polynomial, a set of three-dimensional points, or another appropriate representation. For example, the piecewise polynomial interpolates the actual lane line using highly accurate sections of the lane line identified from a group of elements captured over time using sensor data.

In some embodiments, sensor data is received. The sensor data may include an image (such as video and/or still images), radar, audio, lidar, inertia, odometry, location, and/or other forms of sensor data. The sensor data includes a group of time series elements. For example, a group of time series elements may include a group of images captured from a camera sensor of a vehicle over a time period. In some embodiments, a training dataset is determined including by determining for at least a selected time series element in the group of time series elements a corresponding ground truth based on a plurality of time series elements in the group of time series elements. For example, a ground truth is determined by examining the most relevant portions of each element of the group of time series elements including previous and/or subsequent time series elements in the group. In some scenarios, only the previous and/or subsequent time series elements include data that is absent from earlier time series elements, such as a vehicle lane line that initially disappears around a curve and is only revealed in later elements of the time series. The determined ground truth may be a three-dimensional representation of a vehicle lane line, a predicted path for a vehicle, or another similar prediction. An element of the group of time series elements is selected and associated with the ground truth. The selected element and the ground truth are part of the training dataset. In some embodiments, a processor is used to train a machine learning model using the training dataset. For example, the training dataset is used to train a machine learning model for inferring features used for self-driving or driver-assisted operation of a vehicle. Using the trained machine learning model, a neural network can infer features associated with autonomous driving such as vehicle lanes, drivable space, objects (e.g., pedestrians, stationary vehicles, moving vehicles, etc.), weather (e.g., rain, hail, fog, etc.), traffic control objects (e.g., traffic lights, traffic signs, street signs, etc.), traffic patterns, etc.

In some embodiments, a system comprises a processor and memory coupled to the processor. The processor is configured to receive image data based on an image captured by a camera of a vehicle. For example, a camera sensor affixed to a vehicle captures an image of the vehicle's environment. The camera may be a forward facing camera, a pillar camera, or another appropriately positioned camera. Image data captured from the camera is processed using a processor, such as a GPU or AI processor, on the vehicle. In some embodiments, the image data is used as a basis of an input to a trained machine learning model trained to predict a three-dimensional trajectory of a vehicle lane. For example, the image data is used as an input to a neural network trained to predict vehicle lanes. The machine learning model infers a three-dimensional trajectory for a detected lane. Instead of segmenting the image into lanes and non-lane segments of a two-dimensional image, a three-dimensional representation is inferred. In some embodiments, the three-dimensional representation is a spline, a parametric curve, or another representation capable of describing curves in three-dimensions. In some embodiments, the three-dimensional trajectory of the vehicle lane is provided in automatically controlling the vehicle. For example, the three-dimensional trajectory is used to determine lane lines and corresponding drivable space.

FIG. 1 is a block diagram illustrating an embodiment of a deep learning system for autonomous driving. The deep learning system includes different components that may be used together for self-driving and/or driver-assisted operation of a vehicle as well as for gathering and processing data for training a machine learning model for autonomous driving. In various embodiments, the deep learning system is installed on a vehicle. Data from the vehicle can be used to train and improve the autonomous driving features of the vehicle or other similar vehicles.

In the example shown, deep learning system 100 is a deep learning network that includes sensors 101, image pre-processor 103, deep learning network 105, artificial intelligence (AI) processor 107, vehicle control module 109, and network interface 111. In various embodiments, the different components are communicatively connected. For example, sensor data from sensors 101 is fed to image pre-processor 103. Processed sensor data of image pre-processor 103 is fed to deep learning network 105 running on AI processor 107. The output of deep learning network 105 running on AI processor 107 is fed to vehicle control module 109. In various embodiments, vehicle control module 109 is connected to and controls the operation of the vehicle such as the speed, braking, and/or steering, etc. of the vehicle. In various embodiments, sensor data and/or machine learning results can be sent to a remote server via network interface 111. For example, sensor data can be transmitted to a remote server via network interface 111 to collect training data for improving the performance, comfort, and/or safety of the vehicle. In various embodiments, network interface 111 is used to communicate with remote servers, to make phone calls, to send and/or receive text messages, and to transmit sensor data based on the operation of the vehicle, among other reasons. In some embodiments, deep learning system 100 may include additional or fewer components as appropriate. For example, in some embodiments, image pre-processor 103 is an optional component. As another example, in some embodiments, a post-processing component (not shown) is used to perform post-processing on the output of deep learning network 105 before the output is provided to vehicle control module 109.

In some embodiments, sensors 101 include one or more sensors. In various embodiments, sensors 101 may be affixed to a vehicle, at different locations of the vehicle, and/or oriented in one or more different directions. For example, sensors 101 may be affixed to the front, sides, rear, and/or roof, etc. of the vehicle in forward-facing, rear-facing, side-facing, etc. directions. In some embodiments, sensors 101 may be image sensors such as high dynamic range cameras. In some embodiments, sensors 101 include non-visual sensors. In some embodiments, sensors 101 include radar, audio, LiDAR, inertia, odometry, location, and/or ultrasonic sensors, among others. In some embodiments, sensors 101 are not mounted to the vehicle with vehicle control module 109. For example, sensors 101 may be mounted on neighboring vehicles and/or affixed to the road or environment and are included as part of a deep learning system for capturing sensor data. In some embodiments, sensors 101 include one or more cameras that capture the road surface the vehicle is traveling on. For example, one or more front-facing and/or pillar cameras capture lane markings of the lane the vehicle is traveling in. As another example, cameras capture neighboring vehicles including those attempting to cut into the lane the vehicle is traveling in. Additional sensors capture odometry, location, and/or vehicle control information including information related to vehicle trajectory. Sensors 101 may include both image sensors capable of capturing still images and/or video. The data may be captured over a period of time, such as a sequence of captured data over a period of time. For example, images of lane markings may be captured along with vehicle odometry data over a period of 15 seconds or another appropriate period. In some embodiments, sensors 101 include location sensors such as global position system (GPS) sensors for determining the vehicle's location and/or change in location.

In some embodiments, image pre-processor 103 is used to pre-process sensor data of sensors 101. For example, image pre-processor 103 may be used to pre-process the sensor data, split sensor data into one or more components, and/or post-process the one or more components. In some embodiments, image pre-processor 103 is a graphics processing unit (GPU), a central processing unit (CPU), an image signal processor, or a specialized image processor. In various embodiments, image pre-processor 103 is a tone-mapper processor to process high dynamic range data. In some embodiments, image pre-processor 103 is implemented as part of artificial intelligence (AI) processor 107. For example, image pre-processor 103 may be a component of AI processor 107. In some embodiments, image pre-processor 103 may be used to normalize an image or to transform an image. For example, an image captured with a fisheye lens may be warped and image pre-processor 103 may be used to transform the image to remove or modify the warping. In some embodiments, noise, distortion, and/or blurriness is removed or reduced during a pre-processing step. In various embodiments, the image is adjusted or normalized to improve the result of machine learning analysis. For example, the white balance of the image is adjusted to account for different lighting operating conditions such as daylight, sunny, cloudy, dusk, sunrise, sunset, and night conditions, among others.

In some embodiments, deep learning network 105 is a deep learning network used for determining vehicle control parameters including analyzing the driving environment to determine lane markers, lanes, drivable space, obstacles, and/or potential vehicle paths, etc. For example, deep learning network 105 may be an artificial neural network such as a convolutional neural network (CNN) that is trained on input such as sensor data and its output is provided to vehicle control module 109. As one example, the output may include at least a three-dimensional representation of lane markers. As another example, the output may include at least potential vehicles that are likely to merge into the vehicle's lane. In some embodiments, deep learning network 105 receives as input at least sensor data. Additional input may include scene data describing the environment around the vehicle and/or vehicle specifications such as operating characteristics of the vehicle. Scene data may include scene tags describing the environment around the vehicle, such as raining, wet roads, snowing, muddy, high density traffic, highway, urban, school zone, etc. In some embodiments, the output of deep learning network 105 is a three-dimensional trajectory of the vehicle lane of the vehicle. In some embodiments, the output of deep learning network 105 is a potential vehicle cut-in. For example, deep learning network 105 identifies a neighboring vehicle that is likely to enter into the lane ahead of the vehicle.

In some embodiments, artificial intelligence (AI) processor 107 is a hardware processor for running deep learning network 105. In some embodiments, AI processor 107 is a specialized AI processor for performing inference using a convolutional neural network (CNN) on sensor data. AI processor 107 may be optimized for the bit depth of the sensor data. In some embodiments, AI processor 107 is optimized for deep learning operations such as neural network operations including convolution, dot-product, vector, and/or matrix operations, among others. In some embodiments, AI processor 107 is implemented using a graphics processing unit (GPU). In various embodiments, AI processor 107 is coupled to memory that is configured to provide the AI processor with instructions which when executed cause the AI processor to perform deep learning analysis on the received input sensor data and to determine a machine learning result used for autonomous driving. In some embodiments, AI processor 107 is used to process sensor data in preparation for making the data available as training data.

In some embodiments, vehicle control module 109 is utilized to process the output of artificial intelligence (AI) processor 107 and to translate the output into a vehicle control operation. In some embodiments, vehicle control module 109 is utilized to control the vehicle for autonomous driving. In various embodiments, vehicle control module 109 can adjust speed, acceleration, steering, braking, etc. of the vehicle. For example, in some embodiments, vehicle control module 109 is used to control the vehicle to maintain the vehicle's position within a lane, to merge the vehicle into another lane, to adjust the vehicle's speed and lane positioning to account for merging vehicles, etc.

In some embodiments, vehicle control module 109 is used to control vehicle lighting such as brake lights, turns signals, headlights, etc. In some embodiments, vehicle control module 109 is used to control vehicle audio conditions such as the vehicle's sound system, playing audio alerts, enabling a microphone, enabling the horn, etc. In some embodiments, vehicle control module 109 is used to control notification systems including warning systems to inform the driver and/or passengers of driving events such as a potential collision or the approach of an intended destination. In some embodiments, vehicle control module 109 is used to adjust sensors such as sensors 101 of a vehicle. For example, vehicle control module 109 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In some embodiments, vehicle control module 109 may be used to change parameters of image pre-processor 103 such as modifying the frequency range of filters, adjusting feature and/or edge detection parameters, adjusting channels and bit depth, etc. In various embodiments, vehicle control module 109 is used to implement self-driving and/or driver-assisted control of a vehicle. In some embodiments, vehicle control module 109 is implemented using a processor coupled with memory. In some embodiments, vehicle control module 109 is implemented using an application-specific integrated circuit (ASIC), a programmable logic device (PLD), or other appropriate processing hardware.

In some embodiments, network interface 111 is a communication interface for sending and/or receiving data including voice data. In various embodiments, a network interface 111 includes a cellular or wireless interface for interfacing with remote servers, to connect and make voice calls, to send and/or receive text messages, to transmit sensor data, to receive updates to the deep learning network including updated machine learning models, to retrieve environmental conditions including weather conditions and forecasts, traffic conditions, etc. For example, network interface 111 may be used to receive an update for the instructions and/or operating parameters for sensors 101, image pre-processor 103, deep learning network 105, AI processor 107, and/or vehicle control module 109. A machine learning model of deep learning network 105 may be updated using network interface 111. As another example, network interface 111 may be used to update firmware of sensors 101 and/or operating parameters of image pre-processor 103 such as image processing parameters. As yet another example, network interface 111 may be used to transmit potential training data to remote servers for training a machine learning model.

Figure 2:
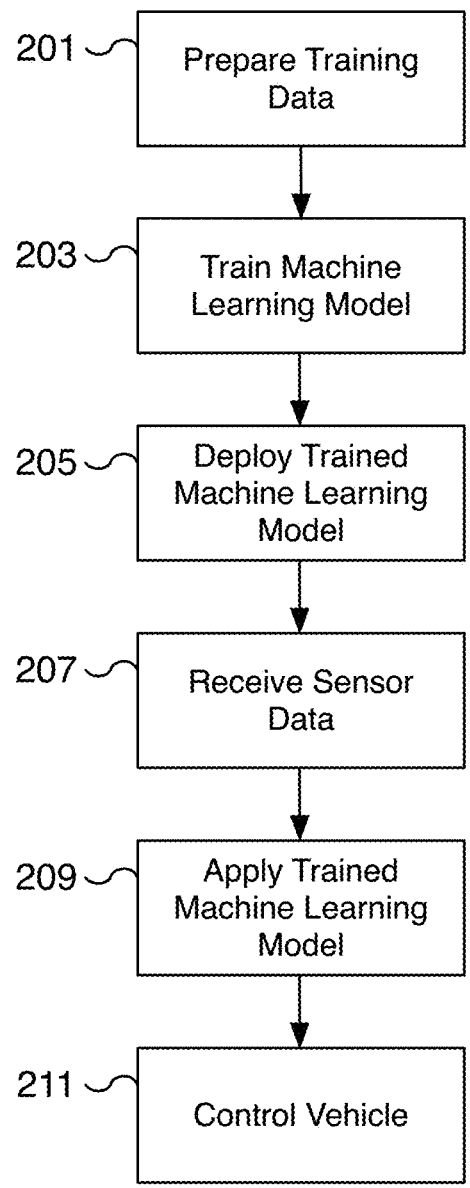
FIG. 2 is a flow diagram illustrating an embodiment of a process for training and applying a machine learning model for autonomous driving.

FIG. 2 is a flow diagram illustrating an embodiment of a process for training and applying a machine learning model for autonomous driving. For example, input data including sensor and odometry data is received and processed to create training data for training a machine learning model. In some embodiments, the sensor data corresponds to image data captured via an autonomous driving system. In some embodiments, the sensor data corresponds to sensor data captured based on particular use cases, such as the user manually disengaging autonomous driving. In some embodiments, the process is used to create and deploy a machine learning model for deep learning system 100 of FIG. 1.

At 201, training data is prepared. In some embodiments, sensor data including image data and odometry data is received to create a training data set. The sensor data may include still images and/or video from one or more cameras. Additional sensors such as radar, lidar, ultrasonic, etc. may be used to provide relevant sensor data. In various embodiments, the sensor data is paired with corresponding odometry data to help identify features of the sensor data. For example, location and change in location data can be used to identify the location of relevant features in the sensor data such as lane lines, traffic control signals, objects, etc. In some embodiments, the sensor data is a time series of elements and is used to determine a ground truth. The ground truth of the group is then associated with a subset of the time series, such as the first frame of image data. The selected element of the time series and the ground truth are used to prepare the training data. In some embodiments, the training data is prepared to train a machine learning model to only identify features from sensor data such as lane lines, vehicle paths, traffic patterns, etc. The prepared training data may include data for training, validation, and testing. In various embodiments, the sensor data may be of different formats. For example, sensor data may be still images, video, audio, etc. The odometry data may include vehicle operation parameters such as applied acceleration, applied braking, applied steering, vehicle location, vehicle orientation, the change in vehicle location, the change in vehicle orientation, etc. In various embodiments, the training data is curated and annotated for creating a training data set. In some embodiments, a portion of the preparation of the training data may be performed by a human curator. In various embodiments, a portion of the training data is generated automatically from data captured from vehicles, greatly reducing the effort and time required to build a robust training data set. In some embodiments, the format of the data is compatible with a machine learning model used on a deployed deep learning application. In various embodiments, the training data includes validation data for testing the accuracy of the trained model.

At 203, a machine learning model is trained. For example, a machine learning model is trained using the data prepared at 201. In some embodiments, the model is a neural network such as a convolutional neural network (CNN). In various embodiments, the model includes multiple intermediate layers. In some embodiments, the neural network may include multiple layers including multiple convolution and pooling layers. In some embodiments, the training model is validated using a validation data set created from the received sensor data. In some embodiments, the machine learning model is trained to predict a three-dimensional representation of a feature from a single input image. For example, a three-dimensional representation of a lane line can be inferred from an image captured from a camera. As another example, the predicted path of a neighboring vehicle including whether the vehicle will attempt to merge is predicted from an image captured from a camera.

At 205, the trained machine learning model is deployed. For example, the trained machine learning model is installed on a vehicle as an update for a deep learning network, such as deep learning network 105 of FIG. 1. In some embodiments, an over-the-air update is used to install the newly trained machine learning model. In some embodiments, the update is a firmware update transmitted using a wireless network such as a WiFi or cellular network. In some embodiments, the new machine learning model may be installed when the vehicle is serviced.

At 207, sensor data is received. For example, sensor data is captured from one or more sensors of the vehicle. In some embodiments, the sensors are sensors 101 of FIG. 1. The sensors may include image sensors such as a fisheye camera mounted behind a windshield, forward or side facing cameras mounted in the pillars, rear-facing cameras, etc. In various embodiments, the sensor data is in the format or is converted into a format that the machine learning model trained at 203 utilizes as input. For example, the sensor data may be raw or processed image data. In some embodiments, the data is data captured from ultrasonic sensors, radar, LiDAR sensors, microphones, or other appropriate technology. In some embodiments, the sensor data is preprocessed using an image pre-processor such as image pre-processor 103 of FIG. 1 during a pre-processing step. For example, the image may be normalized to remove distortion, noise, etc.

At 209, the trained machine learning model is applied. For example, the machine learning model trained at 203 is applied to sensor data received at 207. In some embodiments, the application of the model is performed by an AI processor such as AI processor 107 of FIG. 1 using a deep learning network such as deep learning network 105 of FIG. 1. In various embodiments, by applying the trained machine learning model, three-dimensional representations of features, such as lane lines, are identified and/or predicted. For example, two splines representing the lane lines of the lane the vehicle is traveling in are inferred. As another example, the predicted path of a neighboring vehicle is inferred including whether the neighboring vehicle is likely to cut into the current lane. In various embodiments, vehicles, obstacles, lanes, traffic control signals, map features, object distances, speed limit, drivable space, etc. are identified by applying the machine learning model. In some embodiments, the features are identified in three-dimensions.

At 211, the autonomous vehicle is controlled. For example, one or more autonomous driving features are implemented by controlling various aspects of the vehicle. Examples may include controlling the steering, speed, acceleration, and/or braking of the vehicle, maintaining the vehicle's position in a lane, maintaining the vehicle's position relative to other vehicles and/or obstacles, providing a notification or warning to the occupants, etc. Based on the analysis performed at 209, a vehicle's steering and speed are controlled to maintain the vehicle between two lane lines. For example, left and right lane lines are predicted and a corresponding vehicle lane and drivable space is identified. In various embodiments, a vehicle control module such as vehicle control module 109 of FIG. 1 controls the vehicle.

Figure 3:
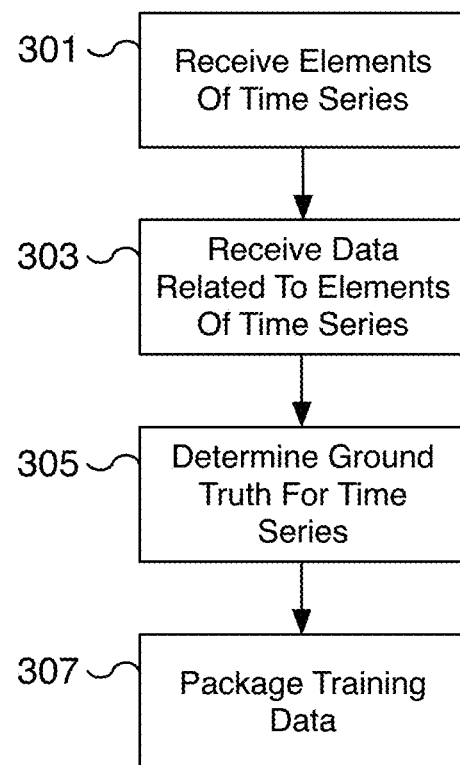
FIG. 3 is a flow diagram illustrating an embodiment of a process for creating training data using a time series of elements.

FIG. 3 is a flow diagram illustrating an embodiment of a process for creating training data using a time series of elements. For example, a time series of elements made up of sensor and odometry data is collected from a vehicle and used to automatically create training data. In various embodiments, the process of FIG. 3 is used to automatically label training data with corresponding ground truths. An outcome corresponding to the time series is associated with an element of the time series. The outcome and selected element are packaged as training data to predict future outcomes. In various embodiments, the sensor and related data are captured using the deep learning system of FIG. 1. For example, in various embodiments, the sensor data is captured from sensor(s) 101 of FIG. 1. In some embodiments, the process of FIG. 3 is performed at 201 of FIG. 2. In some embodiments, the process of FIG. 3 is performed to automatically collect data when existing predictions are incorrect or can be improved. For example, a prediction is made by an autonomous vehicle to determine whether a vehicle is cutting into the path of the autonomous vehicle. After waiting a time period and analyzing captured sensor data, a determination can be made whether the prediction was correct or incorrect. In some embodiments, a determination is made that the prediction can be improved. In the event the prediction was incorrect or could be improved, the process of FIG. 3 can be applied to data related to the prediction to create a curated set of examples for improving the machine learning model.

At 301, elements of a time series are received. In various embodiments, the elements are sensor data such as image data captured at a vehicle and transmitted to a training server. The sensor data is captured over a period of time to create a time series of elements. In various embodiments, the elements are timestamps to maintain an ordering of the elements. As the elements progress through the time series, the events further in the time series are used to help predict an outcome from an earlier element of the time series. For example, a time series may capture a vehicle in an adjacent lane signaling to merge, accelerating, and positioning itself closer to the near lane line. Using the entire time series, the outcome can be used to determine that the vehicle merged into a shared lane. This outcome can be used to predict that a vehicle will merge based on a selected element of the time series, such as one of the early images of the time series. As another example, a time series captures the curve of a lane line. A time series captures the various dips, bends, crests, etc. of a lane that are not apparent from only a single element of the time series. In various embodiments, the elements are sensor data in the format that a machine learning model uses as input. For example, the sensor data may be raw or processed image data. In some embodiments, the data is data captured from ultrasonic sensors, radar, LiDAR sensors, or other appropriate technology.

In various embodiments, the time series is organized by associating a timestamp with each element of the time series. For example, a timestamp is associated with at least the first element in a time series. The timestamp may be used to calibrate time series elements with related data such as odometry data. In various embodiments, the length of the time series may be a fixed length of time, such as 10 seconds, 30 seconds, or another appropriate length. The length of time may be configurable. In various embodiments, the time series may be based on the speed of the vehicle, such as the average speed of the vehicle. For example, at slower speeds, the length of time for a time series may be increased to capture data over a longer distance traveled than would be possible if using a shorter time length for the same speed. In some embodiments, the number of elements in the time series is configurable. For example, the number of elements may be based on the distance traveled. For example, for a fixed time period, a faster moving vehicle includes more elements in the time series than a slower moving vehicle. The additional elements increase the fidelity of the captured environment and can improve the accuracy of the predicted machine learning results. In various embodiments, the number of elements is adjusted by adjusting the frames per second a sensor captures data and/or by discarding unneeded intermediate frames.

At 303, data related to the elements of the time series are received. In various embodiments, the related data is received at a training server along with the elements received at 301. In some embodiments, the related data is odometry data of the vehicle. Using location, orientation, change in location, change in orientation, and/or other related vehicle data, positional data of features identified in the elements of the time series can be labeled. For example, a lane line can be labeled with very accurate position by examining the time series of elements of the lane line. Typically the lane line nearest the vehicle cameras is accurate and closely related to the position of the vehicle. In contrast, the XYZ position of the line furthest away from the vehicle is difficult to determine. The far sections of the lane line may be occluded (e.g., behind a bend or hill) and/or difficult to accurately capture (e.g., due to distance or lighting, etc.). The data related to the elements is used to label portions of features identified in the time series that are identified with a high degree of accuracy. In various embodiments, a threshold value is used to determine whether to associated an identified portion of a feature (such as a portion of a lane line) with the related data. For example, portions of a lane line identified with a high degree of certainty (such as portions near the vehicle) are associated with the related data while portions of a lane line identified with a degree of certainty below a threshold value (such as portions far away from the vehicle) are not associated with the related data of that element. Instead, another element of the time series, such as a subsequent element, with a higher degree of certainty and its related data are used. In some embodiments, the related data is the output of a neural network such as the output of deep learning network 105 of FIG. 1. In some embodiments, the related data is the output of a vehicle control module such as vehicle control module 109 of FIG. 1. The related data may include vehicle operating parameters such as the speed, change in speed, acceleration, change in acceleration, steering, change in steering, braking, change in braking, etc. In some embodiments, the related data is radar data for estimating the distance of objects such as obstacles.

In some embodiments, the data related to the elements of the time series includes map data. For example, offline data such as road and/or satellite level map data is received at 303. The map data may be used to identify features such as roads, vehicle lanes, intersections, speed limits, school zones, etc. For example, the map data can describe the path of vehicle lanes. As another example, the map data can describe the speed limit associated with different roads of the map.

In various embodiments, data related to the elements of the time series are organized by associating a timestamp with the related data. Corresponding timestamps from the time series elements and the related data may be used to synchronize the two data sets. In some embodiments, the data is synchronized at capture time. For example, as each element of a time series is captured, a corresponding set of related data is captured and saved with the time series element. In various embodiments, the time period of the related data is configurable and/or matches the time period of the time series of elements. In some embodiments, the related data is sampled at the same rate as the time series elements.

At 305, a ground truth is determined for the time series. In various embodiments, the time series is analyzed to determine a ground truth associated with a machine learning feature. For example, a lane line is identified from the time series that corresponds to the ground truth for that lane line. As another example, the ground truth for the path of a moving object (such as a vehicle, pedestrian, biker, animal, etc.) is the path identified for a detected moving object from the time series. In some embodiments, in the event the moving vehicle enters into the lane of the autonomous vehicle over the time series, the moving vehicle is annotated as a cut-in vehicle. In some embodiments, the ground truth is represented as a three-dimensional representation such as a three-dimensional trajectory. For example, the ground truth associated with a lane line may be represented as a three-dimensional parameterized spline or curve. As another example, the predicted path for a detected vehicle is determined and represented as a three-dimensional trajectory. The predicted path may be used to determine whether the vehicle is merging into an occupied space. In various embodiments, only by examining the time series of elements can the ground truth be determined. For example, analysis of only a subset of the time series may leave portions of the lane line occluded. By expanding the analysis across a time series of elements, the occluded portions of the lane line are revealed. Moreover, the captured data towards the end of the time series more accurately captures (e.g., with higher fidelity) the details of portions of the lane line further in the distance. Additionally, the related data is also more accurate since the related data is based on data captured closer in proximity (both distance and time). In various embodiments, simultaneous localization and mapping techniques are applied to different portions of a detected object, such as a lane line, identified in different elements of a time series of elements to map different portions of the object to precise three-dimensional locations that include elevation. The set of mapped three-dimensional locations represents the ground truth for the object, such as a segment of a lane line captured over the time series. In some embodiments, the localization and mapping techniques results in a set of precise points, for example, a set of points corresponding to different points along a vehicle lane line. The set of points can be converted to a more efficient format such as a spline or parametric curve. In some embodiments, the ground truth is determined to detect objects such as lane lines, drivable space, traffic controls, vehicles, etc. in three dimensions.

In some embodiments, the ground truth is determined to predict semantic labels. For example, a detected vehicle can be labeled as being in the left lane or right lane. In some embodiments, the detected vehicle can be labeled as being in a blind spot, as a vehicle that should be yielded to, or with another appropriate semantic label. In some embodiments, vehicles are assigned to roads or lanes in a map based on the determined ground truth. As additional examples, the determined ground truth can be used to label traffic lights, lanes, drivable space, or other features that assist autonomous driving.

In some embodiments, the related data is depth (or distance) data of detected objects. By associating the distance data with objects identified in the time series of elements, a machine learning model can be trained to estimate object distances by using the related distance data as the ground truth for detected objects. In some embodiments, the distances are for detected objects such as an obstacle, a barrier, a moving vehicle, a stationary vehicle, traffic control signals, pedestrians, etc.

At 307, the training data is packaged. For example, an element of the time series is selected and associated with the ground truth determined at 305. In various embodiments, the element selected is an early element in the time series. The selected element represents sensor data input to a machine learning model and the ground truth represents the predicted result. In various embodiments, the training data is packaged and prepared as training data. In some embodiments, the training data is packaged into training, validation, and testing data. Based on the determined ground truth and selected element of the time series, the training data can be packaged to train a machine learning model to identify lane lines, the predicted path of a vehicle, speed limits, vehicle cut-ins, object distances, and/or drivable space, among other useful features for autonomous driving. The packaged training data is now available for training a machine learning model.

Figure 4:
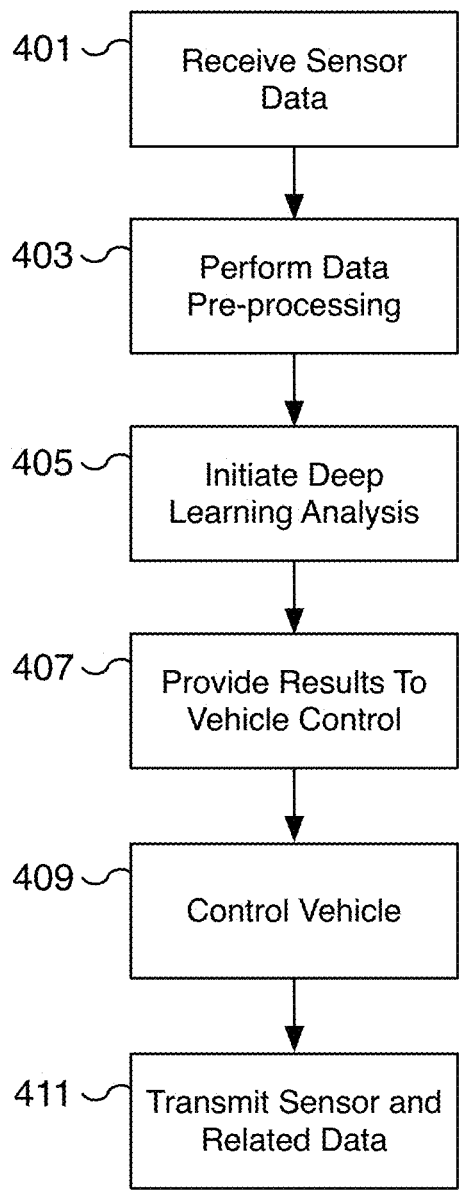
FIG. 4 is a flow diagram illustrating an embodiment of a process for training and applying a machine learning model for autonomous driving.

FIG. 4 is a flow diagram illustrating an embodiment of a process for training and applying a machine learning model for autonomous driving. In some embodiments, the process of FIG. 4 is utilized to collect and retain sensor and odometry data for training a machine learning model for autonomous driving. In some embodiments, the process of FIG. 4 is implemented on a vehicle enabled with autonomous driving whether the autonomous driving control is enabled or not. For example, sensor and odometry data can be collected in the moments immediately after autonomous driving is disengaged, while a vehicle is being driven by a human driver, and/or while the vehicle is being autonomously driven. In some embodiments, the techniques described by FIG. 4 are implemented using the deep learning system of FIG. 1. In some embodiments, portions of the process of FIG. 4 are performed at 207, 209, and/or 211 of FIG. 2 as part of the process of applying a machine learning model for autonomous driving.

At 401, sensor data is received. For example, a vehicle equipped with sensors captures sensor data and provides the sensor data to a neural network running on the vehicle. In some embodiments, the sensor data may be vision data, ultrasonic data, LiDAR data, or other appropriate sensor data. For example, an image is captured from a high dynamic range forward-facing camera. As another example, ultrasonic data is captured from a side-facing ultrasonic sensor. In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. In some embodiments, ultrasonic and/or radar sensors are used to capture surrounding details. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles. The various sensors are used to capture the environment surrounding the vehicle and the captured data is provided for deep learning analysis.

In some embodiments, the sensor data includes odometry data including the location, orientation, change in location, and/or change in orientation, etc. of the vehicle. For example, location data is captured and associated with other sensor data captured during the same time frame. As one example, the location data captured at the time that image data is captured is used to associate location information with the image data.

At 403, the sensor data is pre-processed. In some embodiments, one or more pre-processing passes may be performed on the sensor data. For example, the data may be pre-processed to remove noise, to correct for alignment issues and/or blurring, etc. In some embodiments, one or more different filtering passes are performed on the data. For example, a high-pass filter may be performed on the data and a low-pass filter may be performed on the data to separate out different components of the sensor data. In various embodiments, the pre-processing step performed at 403 is optional and/or may be incorporated into the neural network.

At 405, deep learning analysis of the sensor data is initiated. In some embodiments, the deep learning analysis is performed on the sensor data optionally pre-processed at 403. In various embodiments, the deep learning analysis is performed using a neural network such as a convolutional neural network (CNN). In various embodiments, the machine learning model is trained offline using the process of FIG. 2 and deployed onto the vehicle for performing inference on the sensor data. For example, the model may be trained to identify road lane lines, obstacles, pedestrians, moving vehicles, parked vehicles, drivable space, etc., as appropriate. In some embodiments, multiple trajectories for a lane line are identified. For example, several potential trajectories for a lane line are detected and each trajectory has a corresponding probability of occurring. In some embodiments, the lane line predicted is the lane line with the highest probability of occurring and/or the highest associated confidence value. In some embodiments, a predicted lane line from deep learning analysis requires exceeding a minimum confidence threshold value. In various embodiments, the neural network includes multiple layers including one or more intermediate layers. In various embodiments, the sensor data and/or the results of deep learning analysis are retained and transmitted at 411 for the automatic generation of training data.

In various embodiments, the deep learning analysis is used to predict additional features. The predicted features may be used to assist autonomous driving. For example, a detected vehicle can be assigned to a lane or road. As another example, a detected vehicle can be determined to be in a blind spot, to be a vehicle that should be yielded to, to be a vehicle in the left adjacent lane, to be a vehicle in the right adjacent lane, or to have another appropriate attribute. Similarly, the deep learning analysis can identify traffic lights, drivable space, pedestrians, obstacles, or other appropriate features for driving.

At 407, the results of deep learning analysis are provided to vehicle control. For example, the results are provided to a vehicle control module to control the vehicle for autonomous driving and/or to implement autonomous driving functionality. In some embodiments, the results of deep learning analysis at 405 are passed through one or more additional deep learning passes using one or more different machine learning models. For example, predicted paths for lane lines may be used to determine a vehicle lane and the determined vehicle lane is used to determine drivable space. The drivable space is then used to determine a path for the vehicle. Similarly, in some embodiments, a predicted vehicle cut-in is detected. The determined path for the vehicle accounts for predicted cut-ins to avoid potential collisions. In some embodiments, the various outputs of deep learning are used to construct a three-dimensional representation of the vehicle's environment for autonomous driving which includes predicted paths of vehicles, identified obstacles, identified traffic control signals including speed limits, etc. In some embodiments, the vehicle control module utilizes the determined results to control the vehicle along a determined path. In some embodiments, the vehicle control module is vehicle control module 109 of FIG. 1.

At 409, the vehicle is controlled. In some embodiments, a vehicle with autonomous driving activated is controlled using a vehicle control module such as vehicle control module 109 of FIG. 1. The vehicle control can modulate the speed and/or steering of the vehicle, for example, to maintain a vehicle in a lane at an appropriate speed in consideration of the environment around it. In some embodiments, the results are used to adjust the vehicle in anticipation that a neighboring vehicle will merge into the same lane. In various embodiments, using the results of deep learning analysis, a vehicle control module determines the appropriate manner to operate the vehicle, for example, along a determined path with the appropriate speed. In various embodiments, the result of vehicle controls such as a change in speed, application of braking, adjustment to steering, etc. are retained and used for the automatic generation of training data. In various embodiments, the vehicle control parameters are retained and transmitted at 411 for the automatic generation of training data.

At 411, sensor and related data are transmitted. For example, the sensor data received at 401 along with the results of deep learning analysis at 405 and/or vehicle control parameters used at 409 are transmitted to a computer server for the automatic generation of training data. In some embodiments, the data is a time series of data and the various gathered data are associated together by the computer server. For example, odometry data is associated with captured image data to generate a ground truth. In various embodiments, the collected data is transmitted wirelessly, for example, via a WiFi or cellular connection, from a vehicle to a training data center. In some embodiments, metadata is transmitted along with the sensor data. For example, metadata may include the time of day, a timestamp, the location, the type of vehicle, vehicle control and/or operating parameters such as speed, acceleration, braking, whether autonomous driving was enabled, steering angle, odometry data, etc. Additional metadata includes the time since the last previous sensor data was transmitted, the vehicle type, weather conditions, road conditions, etc. In some embodiments, the transmitted data is anonymized, for example, by removing unique identifiers of the vehicle. As another example, data from similar vehicle models is merged to prevent individual users and their use of their vehicles from being identified.

In some embodiments, the data is only transmitted in response to a trigger. For example, in some embodiments, an incorrect prediction triggers the transmitting of the sensor and related data for automatically collecting data to create a curated set of examples for improving the prediction of a deep learning network. For example, a prediction performed at 405 related to whether a vehicle is attempting to merge is determined to be incorrect by comparing the prediction to the actual outcome observed. The data, including sensor and related data, associated with the incorrect prediction is then transmitted and used to automatically generate training data. In some embodiments, the trigger may be used to identify particular scenarios such as sharp curves, forks in the roads, lane merges, sudden stops, or another appropriate scenario where additional training data is helpful and may be difficult to gather. For example, a trigger can be based on the sudden deactivation or disengagement of autonomous driving features. As another example, vehicle operating properties such as the change in speed or change in acceleration can form the basis of a trigger. In some embodiments, a prediction with an accuracy that is less than a certain threshold triggers transmitting the sensor and related data. For example, in certain scenarios, a prediction may not have a Boolean correct or incorrect result and is instead evaluated by determining an accuracy value of the prediction.

In various embodiments, the sensor and related data are captured over a period of time and the entire time series of data is transmitted together. The time period may be configured and/or be based on one or more factors such as the speed of the vehicle, the distance traveled, the change in speed, etc. In some embodiments, the sampling rate of the captured sensor and/or related data is configurable. For example, the sampling rate is increased at higher speeds, during sudden braking, during sudden acceleration, during hard steering, or another appropriate scenario when additional fidelity is needed.

Figure 5:
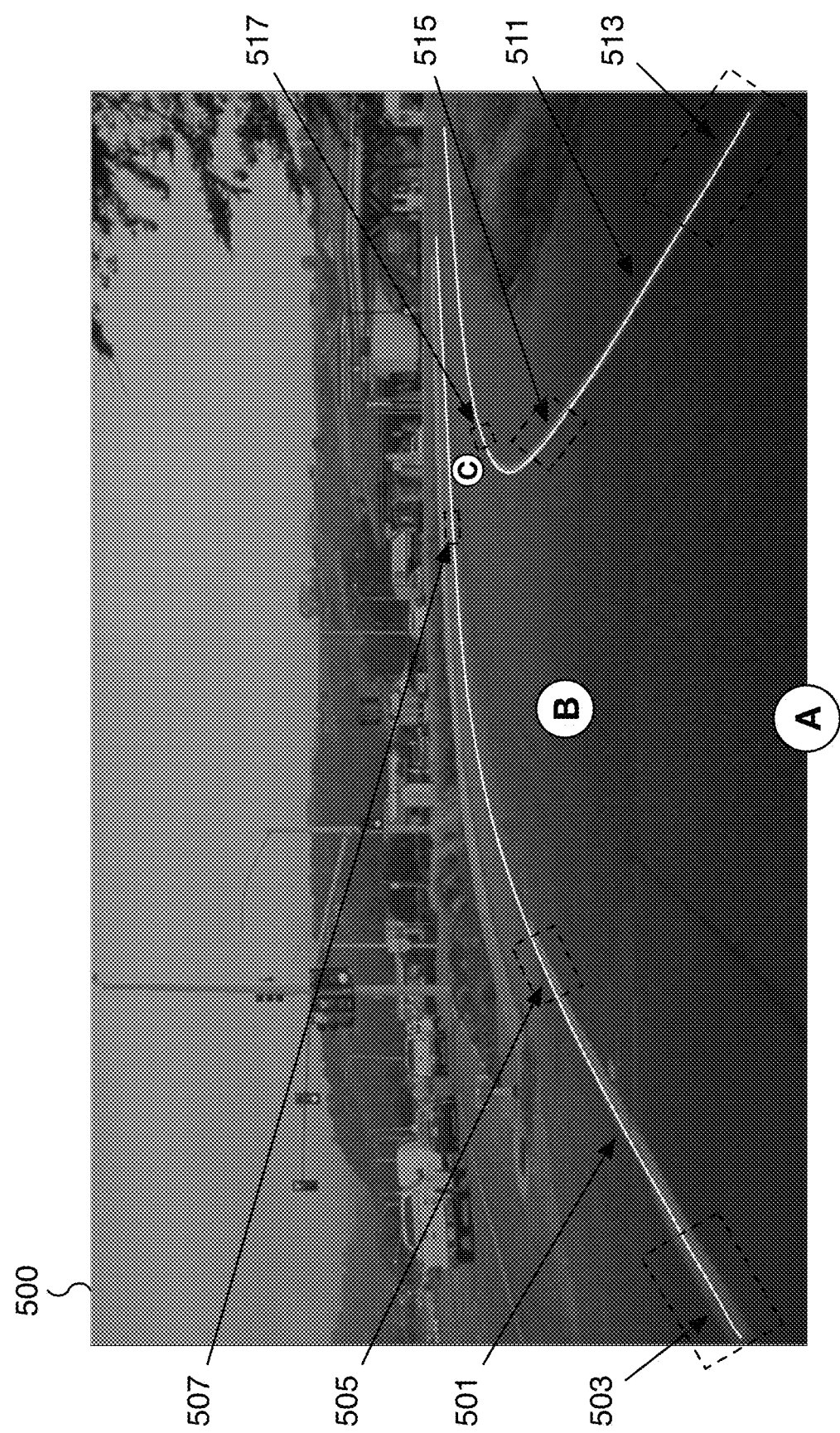
FIG. 5 is a diagram illustrating an example of an image captured from a vehicle sensor.

FIG. 5 is a diagram illustrating an example of an image captured from a vehicle sensor. In the example shown, the image of FIG. 5 includes image data 500 captured from a vehicle traveling in a lane between two lane lines. The location of the vehicle and sensor used to capture image data 500 is represented by label A Image data 500 is sensor data and may be captured from a camera sensor such as a forward-facing camera of the vehicle while driving. Image data 500 captures portions of lane lines 501 and 511. Lane lines 501 and 511 curve to the right as lane lines 501 and 511 approach the horizon. In the example shown, lane lines 501 and 511 are visible but become increasingly difficult to detect as they curve away from the location of the camera sensor off into the distance. The white lines drawn on top of lane lines 501 and 511 approximate the detectable portions of lane lines 501 and 511 from image data 500 without any additional input. In some embodiments, the detected portions of lane lines 501 and 511 can be detected by segmenting image data 500.

In some embodiments, labels A, B, and C correspond to different locations on the road and to different times of a time series. Label A corresponds to the time and location of the vehicle at the time that image data 500 is captured. Label B corresponds to a location on the road ahead of the location of label A and at a time after the time of label A Similarly, label C corresponds to a location on the road ahead of the location of label B and at a time after the time of label B. As the vehicle travels, it passes through the locations of labels A, B, and C (from label A to label C) and captures a time series of sensor and related data while traveling. The time series includes elements captured at the locations (and times) of labels A, B, and C. Label A corresponds to a first element of the time series, label B corresponds to an intermediate element of the time series, and label C corresponds to an intermediate (or potentially last) element of the time series. At each label, additional data is captured such as the odometry data of the vehicle at the label location. Depending on the length of the time series, additional or fewer data is captured. In some embodiments, a timestamp is associated with each element of the time series.

In some embodiments, a ground truth (not shown) for lane lines 501 and 511 is determined. For example, using the processes disclosed herein, locations of lane lines 501 and 511 are identified by identifying different portions of the lane lines 501 and 511 from different elements of a time series of elements. In the example shown, portions 503 and 513 are identified using image data 500 and related data (such as odometry data) taken at the location and time of label A Portions 505 and 515 are identified using image data (not shown) and related data (such as odometry data) taken at the location and time of label B. Portions 507 and 517 are identified using image data (not shown) and related data (such as odometry data) taken at the location and time of label C. By analyzing a time series of elements, the location of different portions of lane lines 501 and 511 are identified and a ground truth can be determined by combining the different identified portions. In some embodiments, the portions are identified as points along each portion of a lane line. In the example shown, only three portions for each lane line are highlighted (portions 503, 505, and 507 for lane line 501 and portions 513, 515, and 517 for lane line 511) to explain the process but additional portions may be captured over a time series to determine the location of the lane line at a higher resolution and/or with greater accuracy.

In various embodiments, the locations of portions in image data capturing lane lines 501 and 511 that are closest to the location of the sensor are determined with a high degree of accuracy. For example, the locations of portions 503 and 513 are identified with a high degree of accuracy using image data 500 and related data (such as odometry data) of label A The locations of portions 505 and 515 are identified with a high degree of accuracy using image and related data of label B. The locations of portions 507 and 517 are identified with a high degree of accuracy using image and related data of label C. By utilizing a time series of elements, the locations of various portions of lane lines 501 and 511 that are captured by the time series can be identified with a high degree of accuracy in three dimensions and used as a basis for the ground truth of lane lines 501 and 511. In various embodiments, the determined ground truth is associated with a selected element of the time series, such as image data 500. The ground truth and selected element may be used to create training data for predicting lane lines. In some embodiments, the training data is created automatically and without human labeling. The training data can be used to train a machine learning model to predict the three-dimensional trajectory of a lane line from captured image data, such as image data 500.

Figure 6:
FIG. 6 is a diagram illustrating an example of an image captured from a vehicle sensor with predicted three-dimensional trajectories of lane lines.

FIG. 6 is a diagram illustrating an example of an image captured from a vehicle sensor with predicted three-dimensional trajectories of lane lines. In the example shown, the image of FIG. 6 includes image data 600 captured from a vehicle traveling in a lane between two lane lines. The location of the vehicle and sensor used to capture image data 600 is represented by label A In some embodiments, label A corresponds to the same location as label A of FIG. 5. Image data 600 is sensor data and may be captured from a camera sensor such as a forward-facing camera of the vehicle while driving. Image data 600 captures portions of lane lines 601 and 611. Lane lines 601 and 611 curve to the right as lane lines 601 and 611 approach the horizon. In the example shown, lane lines 601 and 611 are visible but become increasingly difficult to detect as they curve away from the location of the camera sensor and off into the distance. The red lines drawn on top of lane lines 601 and 611 are predicted three-dimensional trajectories of lane lines 601 and 611. Using the processes disclosed herein, the three-dimensional trajectories are predicted using image data 600 as an input to a trained machine learning model. In some embodiments, a predicted three-dimensional trajectory is represented as a three-dimensional parameterized spline or another parameterized form of representation.

In the example shown, portions 621 of lane lines 601 and 611 are parts of lane lines 601 and 611 that are off in the distance. The three-dimensional location (i.e., the longitude, latitude, and altitude) of portions 621 of lane lines 601 and 611 are determined with a high degree of accuracy using the processes disclosed herein and are included in the predicted three-dimensional trajectories of lane lines 601 and 611. Using a trained machine learning model, three-dimensional trajectories of lane lines 601 and 611 can be predicted using image data 600 and without requiring location data at the locations of portions 621 of lane lines 601 and 611. In the example shown, image data 600 is captured at the location and time of label A In some embodiments, label A of FIG. 6 corresponds to label A of FIG. 5 and the predicted three-dimensional trajectories of lane lines 601 and 611 are determined using only image data 600 as input to a trained machine learning model. By training the machine learning model using a ground truth determined using image and related data of a time series that includes elements taken at the locations of labels A, B, and C of FIG. 5, three-dimensional trajectories of lane lines 601 and 611 are predicted with a high degree of accuracy even portions of the lane lines in the distance, such as portions 621. Although image data 600 and image data 500 of FIG. 5 are related, the prediction of trajectories does not require image data 600 to be included in the training data. By training on sufficient training data, lane lines can be predicted even for newly encountered scenarios. In various embodiments, the predicted three-dimensional trajectories of lane lines 601 and 611 are used to maintain the position of the vehicle within the detected lane lines and/or to autonomously navigate the vehicle along the detected lane of the prediction lane lines. By predicting the lane lines in three-dimensions, the performance, safely, and accuracy of the navigation is vastly improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising: receiving, by one or more processors, sensor data of a group of time series elements; determining, by the one or more processors, a training dataset, including by determining for at least a selected time series element in the group of time series elements a corresponding ground truth based on a plurality of time series elements in the group of time series elements; and training, by the one or more processors, using the training dataset, a machine learning model to output a predicted ground truth based on a single time series element, the training dataset comprising the selected time series element in the group of time series elements and the corresponding ground truth.

2. The method of claim 1, wherein determining the training dataset further comprises identifying, by the one or more processors, a relevant portion of the selected time series element of the group of time series elements, wherein the relevant portion includes one or more of a lane line, a traffic control signal, and an object.

3. The method of claim 1, wherein the corresponding ground truth is a three-dimensional representation of an attribute of the selected time series element of the group of time series elements.

4. The method of claim 3, wherein the three-dimensional representation represents a vehicle lane, a predicted path of a vehicle, an obstacle, a traffic control signal, a map feature, an object distance, or a drivable space.

5. The method of claim 1, wherein the sensor data of the group of time series elements comprises a plurality of images captured at respective times.

6. The method of claim 1, further comprising determining, by the one or more processors, the corresponding ground truth based on the sensor data.

7. The method of claim 6, wherein determining the corresponding ground truth comprises:
identifying, by the one or more processors, for at least one time series element, a respective portion of the at least one time series element to form the corresponding ground truth, and
generating, by the one or more processors, the corresponding ground truth based on the identified respective portion.

8. The method of claim 1, wherein determining the training dataset further comprises:
selecting, by the one or more processors, an element of the group of time series elements;
associating, by the one or more processors, the element of the group of time series elements with the corresponding ground truth; and
including, by the one or more processors, the element and the associated corresponding ground truth in the training dataset.

9. The method of claim 1, further comprising inferring, by the one or more processors, a feature of the sensor data based on the training dataset, wherein the feature includes at least one of a vehicle lane, a drivable space, a pedestrian, a stationary vehicle, a moving vehicle, rain, hail, fog, a traffic light, a traffic sign, a street sign, and a traffic pattern.

10. A system comprising: one or more processors; and a memory coupled with the one or more processors, wherein the memory is configured to provide the one or more processors with instructions which when executed cause the one or more processors to: receive sensor data of a group of time series elements; determine a training dataset, including by determining for at least a selected time series element in the group of time series elements a corresponding ground truth based on a plurality of time series elements in the group of time series elements; and train, using the training dataset, a machine learning model to output a predicted ground truth based on a single time series element, the training dataset comprising the selected time series element in the group of time series elements and the corresponding ground truth.

11. The system of claim 10, wherein determining the training dataset further comprises identifying, by the one or more processors, a relevant portion of the selected time series element of the group of time series elements, wherein the relevant portion includes one or more of a lane line, a traffic control signal, and an object.

12. The system of claim 10, wherein the corresponding ground truth is a three-dimensional representation of an attribute of the selected time series element of the group of time series elements.

13. The system of claim 12, wherein the three-dimensional representation represents a vehicle lane, a predicted path of a vehicle, an obstacle, a traffic control signal, a map feature, an object distance, or a drivable space.

14. The system of claim 10, wherein the sensor data of the group of time series elements comprises a plurality of images captured at respective times.

15. The system of claim 10, further comprising determining, by the one or more processors, the corresponding ground truth based on the sensor data.

16. The system of claim 15, wherein determining the corresponding ground truth comprises:
identifying, by the one or more processors, for at least one time series element, a respective portion of the at least one time series element to form the corresponding ground truth, and
generating, by the one or more processors, the corresponding ground truth based on the identified respective portion.

17. The system of claim 10, wherein determining the training dataset further comprises:
selecting, by the one or more processors, an element of the group of time series elements;
associating, by the one or more processors, the element of the group of time series elements with the corresponding ground truth; and
including, by the one or more processors, the element and the associated corresponding ground truth in the training dataset.

18. The system of claim 10, further comprising inferring, by the one or more processors, a feature of the sensor data based on the training dataset, wherein the feature includes at least one of a vehicle lane, a drivable space, a pedestrian, a stationary vehicle, a moving vehicle, rain, hail, fog, a traffic light, a traffic sign, a street sign, and a traffic pattern.

19. A non-transitory computer-readable storage medium comprising instructions which when executed by one or more processors, cause the one or more processors to: receive sensor data of a group of time series elements; determine a training dataset, including by determining for at least a selected time series element in the group of time series elements a corresponding ground truth based on a plurality of time series elements in the group of time series elements; and train, using the training dataset, a machine learning model to output a predicted ground truth based on a single time series element, the training dataset comprising the selected time series element in the group of time series elements and the corresponding ground truth.

20. The non-transitory computer-readable storage medium of claim 19, wherein the instructions further cause the one or more processors to:
select an element of the group of time series elements;
associate the element of the group of time series elements with the corresponding ground truth; and
include the element and the associated corresponding ground truth in the training dataset.

* * * * *